United States Patent
Libertini, Jr.

[11] Patent Number: 6,024,081
[45] Date of Patent: Feb. 15, 2000

[54] COOKING GRATE

[76] Inventor: Carlo Libertini, Jr., 210 Forest St., Waltham, Mass. 02154

[21] Appl. No.: 09/038,526

[22] Filed: Mar. 11, 1998

[51] Int. Cl.⁷ ..................................................... A47J 37/00
[52] U.S. Cl. ........................ 126/41 R; 126/39 B; 126/14; 99/445; 99/447; 99/450; 99/401
[58] Field of Search ................................ 126/41 R, 39 R, 126/39 B, 39 C, 14, 25 R, 51; 99/445, 450, 422, 441, 447, 401, 444

[56] References Cited

U.S. PATENT DOCUMENTS

| | | | |
|---|---|---|---|
| 833,529 | 10/1906 | Jones | 99/450 |
| 3,788,209 | 1/1974 | Artar et al. | 99/450 |
| 4,727,853 | 3/1988 | Stephen et al. | 126/41 R |
| 5,054,467 | 10/1991 | Videtto, Jr. | 99/445 |
| 5,211,105 | 5/1993 | Liu | 99/450 |
| 5,447,097 | 9/1995 | Rhee | 99/450 |
| 5,453,574 | 9/1995 | Zuran et al. | 126/41 R |
| 5,617,778 | 4/1997 | Schroeter et al. | 99/447 |
| 5,714,740 | 2/1998 | Kelly et al. | 99/444 |

*Primary Examiner*—Ira S. Lazarus
*Assistant Examiner*—Josiah C. Cocks
*Attorney, Agent, or Firm*—Louis J. Franco

[57] ABSTRACT

A cooking grate configured especially to accommodate and cook generally cylindrical food items such as frankfurters and sausage is provided. The design permits the cooking of cylindrical food items faster, more efficiently, and more evenly while minimizing undesirable burning and charring. The apparatus includes a unitary grate body made from a heat-conductive material which grate body has an upper cooking surface, a lower heat collecting surface, a rear edge, a forward edge, and left and right sides. The grate body is corrugated to form a plurality of substantially parallel and adjacent cooking troughs extending in the transverse direction from the rear edge to the forward edge. Each cooking trough has a spine as its lowermost portion and left and right cooking faces originating at the spine and diverging upwardly to converge upon the right and left cooking faces of the adjacent tough respectively to form peaks at the junctions of the same. Disposed along the grate body in rows which extend generally horizontally from the left to the right side of the grate body are sets of lower heat ports. The lower heat ports are such that they are each entirely contained within a given trough beginning at a left boundary on the left cooking face of that trough at an elevation lower than the peak at the top of that cooking face, extending through the spine of that trough, and up the sloped, diverging right cooking face of that trough to a right boundary located below the peak at the top of that right cooking face. The cooking grate further includes a plurality of upper heat ports each of which begins at a left end on a right cooking face in ones trough, extends through the peak at the top of the right cooking face, and down the left cooking face of the neighboring trough. The lower and upper heat parts are arranged in rows that extend generally horizontally along the width of the grate body between its left and right sides. This configuration results in the trapping, reflecting and redirecting of heat rising from the heat source below the heat-collecting surface over the top portion of the cylindrical food items to cook them more evenly and efficiently.

18 Claims, 7 Drawing Sheets

COOKING GRATE

FIELD OF THE INVENTION

This invention relates generally to cooking grates and surfaces, and more particularly to portable cooking grates of the type used primarily on barbecue grills.

BACKGROUND OF THE INVENTION

Many designs for barbecue grills and other cooking devices generally, and their cooking grates and surfaces in particular, exist in the prior art, and several of these have been the subject of United States Patents. Some of these prior designs have focused on channeling liquefied fats and juices away from the food being cooked and away from the fire to a reservoir to avoid burning food and presenting fire and burn hazards while others have sought to improve the manner in which the food itself is cooked by trapping and distributing more of the thermal energy provided by the heat source. The present invention relates most closely to cooking grates and surfaces that trap and distribute heat to the food being cooked thereon. However, even the prior cooking grates with the same general purpose universally have a single element or combination of elements which define a planar, substantially horizontal cooking surface capable of receiving any kind of food the user sees fit to deposit on it. None of these prior cooking grates has been configured especially to accommodate generally cylindrical food items such as hotdogs and sausage which are subject to uneven cooking and rapid external burning before the inside is cooked unless monitored with tenacity while cooking. Not only do many persons find it difficult to barbecue a hotdog or sausage without burning at least some portion of it, the product is often one that many persons do not enjoy; an unevenly cooked, charred, and dried out meat product.

The present invention permits the cooking of cylindrical foodstuffs faster, more efficiently, and more evenly while minimizing undesirable burning and charring associated with prior devices.

SUMMARY OF THE INVENTION

The instant invention is of a specialty cooking grate which is designed exclusively for the cooking of substantially cylindrical foodstuffs such as hotdogs, sausage, and even shish kabobs.

It is an object of this invention to provide a cooking grate, which most commonly will be used in conjunction with a barbecue grill, that allows persons to evenly cook cylindrical food items such as hotdogs and sausage without undesired burning.

It is a second object of this invention to decrease the time required to cook cylindrical food items with a unique heat trapping and distributing grate which reflects and channels cooking heat relatively evenly over the entire cylindrical surface of the food items for which it is designed, thereby minimizing the need for the user to intently monitor and frequently turn the food.

It is a third object of this invention to provide a cooking grate of the kind described that is portable and secondary in that it may be placed on top of an existing cooking grate such as those found on most barbecue grills.

It is a fourth object of this invention to provide a cooking grate that increases the energy efficiency of cooking cylindrical food items by trapping, reflecting and utilizing more of the heat for cooking than prior devices.

It is a fifth object of the invention to provide a grate that is durable, simple to manufacture, and low in cost.

The foregoing and other objects and advantages are achieved by the present invention which, according to a first embodiment, provides a unitary grate body made from a conductive material, preferably steel, the grate body having an upper cooking surface and a lower heat collecting surface, a rear edge, a forward edge, and left and right sides. The grate comprises several elements that extend parallel to other elements and perpendicularly (or transversely) to others. For purposes of establishing orientation throughout the description and claims, the horizontal direction extends between the left side of the grate body and the right side of the grate body and the transverse direction extends perpendicularly to the horizontal direction between the rear and forward edges of the grate body.

The grate body is corrugated to form a plurality of substantially parallel and adjacent cooking troughs which extend in the transverse direction. Each cooking trough has a spine, which is the lowermost portion of the trough, and a pair of sloped, upwardly extending and diverging cooking faces, each of which meets a cooking face converging on itself from an adjacent trough to form a peak, except for the cooking faces at the extreme left and right sides of the cooking grate, so that, in its preferred embodiment, a grate constructed in accordance with the principles of the present invention resembles a saw-tooth wave when viewed from the forward or rear edge. Alternative designs, including ones with substantially sinusoidal cross-sections, may function to fulfill the intent of this invention as well, but are believed by the inventor to be more difficult to manufacture and may be less versatile in terms of the diameters of cylindrical foodstuffs that they could accommodate and effectively cook. In such circumstances where the cooking grate is of substantially sinusoidal cross-section, or otherwise of a non-saw-toothed cross-section, the left and right cooking faces would necessarily be other than substantially planar as they extended between the spines and peaks defining the lowermost portions and tops of each cooking trough, resulting in a greater amount of material being required to construct a grate of substantially the same dimensions as a corresponding saw-tooth-cross-section embodiment. Because the saw-tooth design has actually been reduced to practice by the inventor and is regarded by the inventor as representing the most efficient use of material and being the simplest to construct, the remainder of this description focuses primarily on that design.

Extending horizontally in alternating rows along the entire width of the grate body, are sets of upper heat ports and lower heat ports. The rows are uniform in and of themselves in that a particular row of heat ports is dedicated either to upper heat ports or lower heat ports. Both types of heat ports preferably comprise elongated openings in the grate body with the long sides of each such opening extending in the horizontal direction. The upper and lower heat ports are offset from one another as is best understood through explanation of the position of each type individually. Each upper heat port begins at a point along one sloped, upwardly extending cooking face higher than the spine of the trough in which it begins, ex:tends up the cooking face, through the peak and down the sloped convergent cooking face of the neighboring trough to a point above the spine of that neighboring trough. The beginning and ending points of each upper heat port should be at substantially the same height relative to a first plane containing the spines of each trough. The exceptions to this description of the positions of upper heat ports are the upper heat ports at the extreme right and left sides of the grate body which terminate at or near the highest point of the sloped face in which they begin, the left and right sides of the grate body being substantially vertical and closed. In the invention's broadest aspect, the upper heat ports are excluded.

Each lower heat port begins at a point along one sloped, upwardly extending cooking face lower than the peak at the top of that face, extends downwardly, through the spine of the trough in which it begins, and up the other sloped, diverging cooking face of the same trough to a point below the peak at the top of that other face. The beginning and ending points of each lower heat port should be at substantially the same depth below a second plane containing the peaks above them. In the preferred embodiment, the second plane containing the peaks at the tops of the troughs is substantially parallel to the first plane containing the spines of each trough, although the peaks and troughs could lie in planes that are out of parallel to produce troughs of varying widths and depths to accommodate cylindrical foodstuffs of differing diameters on a single grate body; indeed, there is no absolute requirement that the peaks and troughs lie within planes at all, it is simply preferred that they be so arranged. Furthermore, the beginning and ending points of the lower heat ports define a diametric threshold above which the top of an item of cylindrical foodstuff should not extend while cooking if maximum cooking efficiency is to be realized. Specifically, the diametric threshold is an imaginary line segment extending between the two end points of a lower heat port. When the grate specifications and conditions regarding foodstuff diameter are meet, the foodstuff is cooked with maximum efficiency. The top of the cylindrical foodstuff is cooked by heat that is first trapped under the peaks on the heat collecting surface side of the grate body and then forced through the lower heat ports over the top of the cylindrical foodstuff and/or heat that is reflected through the lower heat ports from the heat collecting underside of neighboring cooking faces. In those aspects of the invention in which they are included, the upper heat ports also contribute to the cooking of the sides and tops of cylindrical foodstuffs, but to a lesser degree than the lower heat ports.

Other objects, features, and advantages of this invention will occur to those skilled in the art from the following detailed description of a preferred embodiment of the present invention and the accompanying drawings.

BRIEF DESCRIPTION OF THE DRAWINGS

FIGS. 6a and 6b illustrate examples of alternative embodiments that are within the scope of the present invention, but not described as preferred embodiments; FIG. 6a illustrates a cooking grate having a sinusoidal cross-section as viewed from the rear or forward edge while

DETAILED DESCRIPTION OF THE PREFERRED EMBODIMENT

There is shown in FIGS. 1 through 5 a cooking grate 10 according to a preferred embodiment of the present invention. Cooking grate 10 comprises a unitary grate body 20, which is preferably made from a heat conductive and durable metal or metal alloy such as steel. Grate body 20 has an upper cooking surface 22, a lower heat collecting surface 24, a rear edge 25, a forward edge 26, a left side 27 and a right side 28. Left and right sides 27 and 28 are preferably substantially vertical and closed.

Grate body 20 is corrugated to form a plurality of substantially parallel and adjacent cooking troughs 40 which extend between rear edge 25 and forward edge 26. For purposes of directional reference, edges 25 and 26, which are preferably substantially parallel to one another, are regarded as extending in the horizontal direction while cooking troughs 40 are regarded as extending in the transverse direction. Each cooking trough 40 has a spine 42, which is the lowermost portion of the trough 40, and a pair of sloped, upwardly extending, diverging cooking faces, specifically, a left cooking face 44 and a right cooking face 46, each cooking face 44 and 46 being substantially planar in the preferred embodiment. Except for the extreme left cooking face 44' adjacent left side 27 of cooking grate 20 and the extreme right cooking face 46' adjacent right side 28 of grate 20, each left cooking face 44 converges with a right cooking face 46, from an adjacent trough 40, to form a peak 48. The same is true of each right cooking face 46; each converges with a left cooking face 44, from an adjacent trough, at a peak 48. In this way, a preferred embodiment of cooking grate 20 resembles a saw-tooth wave when viewed from either the rear edge 25 or forward edge 26.

Figure 6A:
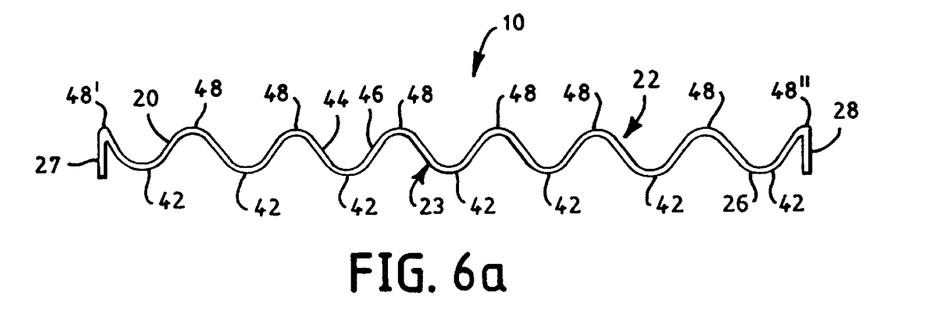
Figure 6B:
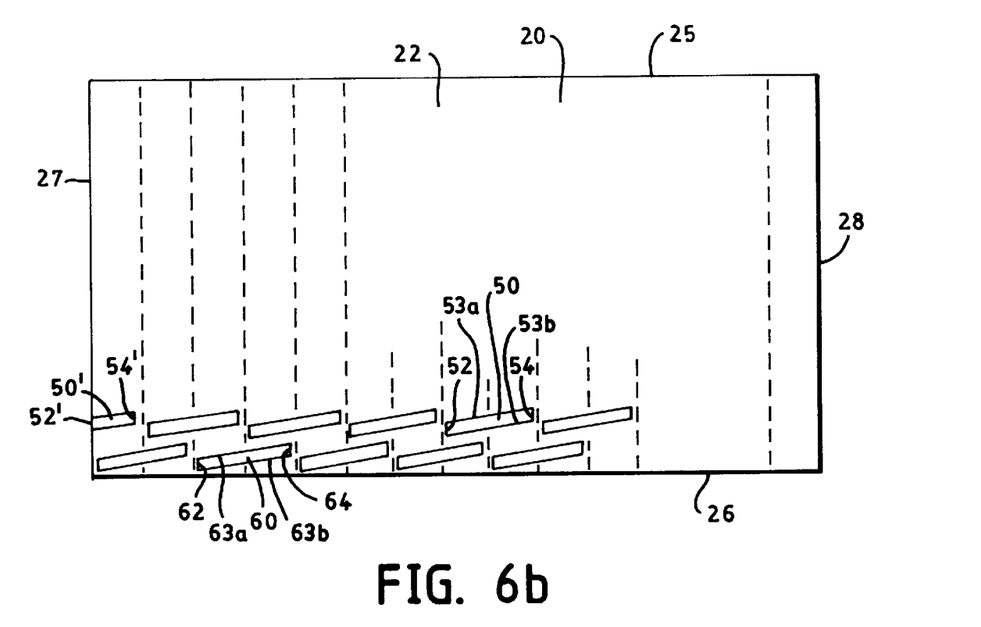
FIG. 6b illustrates a planar plate of metal after enough heat ports have been punched through it to illustrate the pattern of the ports, but before it has been formed to create troughs, in which the long sides of the heat ports extend partially in the horizontal direction, but are not parallel with the rear and forward edges of the grate body. The dashed lines indicate where the plate is to be bent to create the peaks and spines of the troughs.

Extending generally horizontally in alternating rows along the width of grate body 20 are sets of upper heat ports 50 and lower heat ports 60. By "alternating", it is meant that no two rows of upper heat ports 50 are adjacent one another and no two row, of lower heat ports 60 are adjacent one another as shown in the drawings, the exception being where upper heat ports 50 are altogether excluded as in the broadest aspect of the invention. The rows are uniform in and of themselves in that a particular row of heat ports is dedicated either to upper heat ports 50 or lower heat ports 60. Furthermore, the rows are preferably substantially parallel to one another and to rear and forward edges 25 and 26 of grate body 20, although they need not be. Both types of heat ports 50 and 60 preferably comprise elongated openings in grate body 20, upper heat ports 50 having long sides 53a and 53b and lower heat ports 60 having long sides 63a and 63b, the long sides 53a, 53b, 63a, and 63b of each such respective opening extending at least partially in the horizontal direction. By stating that long sides 53a, 53b, 63a, and 63b of heat ports 50 and 60 extend "at least partially in the horizontal direction," it is explicitly intended by the inventor that embodiments in which long sides 53a, 53b, 63a, and 63b of the openings of heat ports 50 and 60 themselves are not parallel to rear and forward edges 25 and 26, or even to one another, even where the rows containing heat ports 50 and 60 are parallel to rear and forward edges 25 and 26, are within the scope and contemplation of this invention. FIG. 6b illustrates one example of a configuration in which long sides 53a, 53b, 63a, and 63b are not parallel to rear and forward edges 25 and 26, but which nonetheless belong to heat ports 50 and 60 which reside in rows which may be regarded as substantially parallel to rear and forward edge 25 and 26 and to one another. Specifically, FIG. 6b illustrates a flat plate of steel, before it has been formed to create troughs 40, in which a sufficient number of upper and lower heat ports 50 and 60 have been punched to illustrate the suggested alternative pattern. In all cases, however, upper and lower heat ports 50 and 60 are preferably offset from one another when viewed perpendicularly to the rear or forward edge 25 or 26 (i.e., when viewed in the transverse direction) of grate body 20 as is best understood through explanation of the position of each type of heat port 50 and 60 individually.

Each upper heat port 50 begins at a left end 52 on a right cooking face 46 of a cooking trough 40 at an elevation higher than the spine 42 of the trough 40 in which it begins, extends up the right cooking face 46, through the peak 48 and down the sloped, convergent left cooking face 44 of the adjacent trough 40 to a right end 54 located above the spine 42 of that adjacent trough 40. The left and right ends 52 and 54 of each upper heat port 50 should be at substantially the same elevation relative to a first plane P1 containing the spines 42 of each trough 40. The exceptions to this description of the positions of upper heat ports 50 are the upper heat ports 50 immediately adjacent left and right sides 27 and 28 of grate body 20 which upper heat ports are designated by the reference numbers 50' and 50" respectively.

Each upper heat port 50' located in the extreme left cooking face 44' adjacent left side 27 of grate body 20 begins at a left end 52', which is at substantially the same elevation as, or lower than, left side peak 48' formed at the junction of left side 27 and extreme left cooking face 44', and terminates at a right end 54' which is at substantially the same elevation as the left and right ends 52 and 54 of the remaining upper heat ports 50 in grate body 20. Similarly, each upper heat port 50" located in the extreme right cooking face 46' adjacent right side 28 of grate body 20 begins at a left end 52", which is at substantially the same elevation as the left and right ends 52 and 54 of the remaining upper heat ports 50 in grate body 20, and terminates at a right end 54", which is at substantially the same elevation as, or lower than, right side peak 48" formed at the junction of right side 28 and extreme right cooking face 46'.

Turning to lower heat ports 60, each lower heat port 60 begins at a left boundary 62 on a left cooking face 44 of a cooking trough 40 at an elevation lower than the peak 48 at the top of that face 44, extends downwardly, through the spine 42 of the trough 40 in which it begins, and up the sloped, diverging right cooking face 46 of the same trough 40 to a right boundary 64 below the peak 48 at the top of that sloped, diverging right cocking face 46. It will be appreciated from this description that each lower heat port 60 is disposed entirely within a single cooking trough 40. The left and right boundaries 62 and 64 of each lower heat port 60 should be at substantially the same elevation relative to the first plane P1 containing the spines 42 below them.

Figure 1:
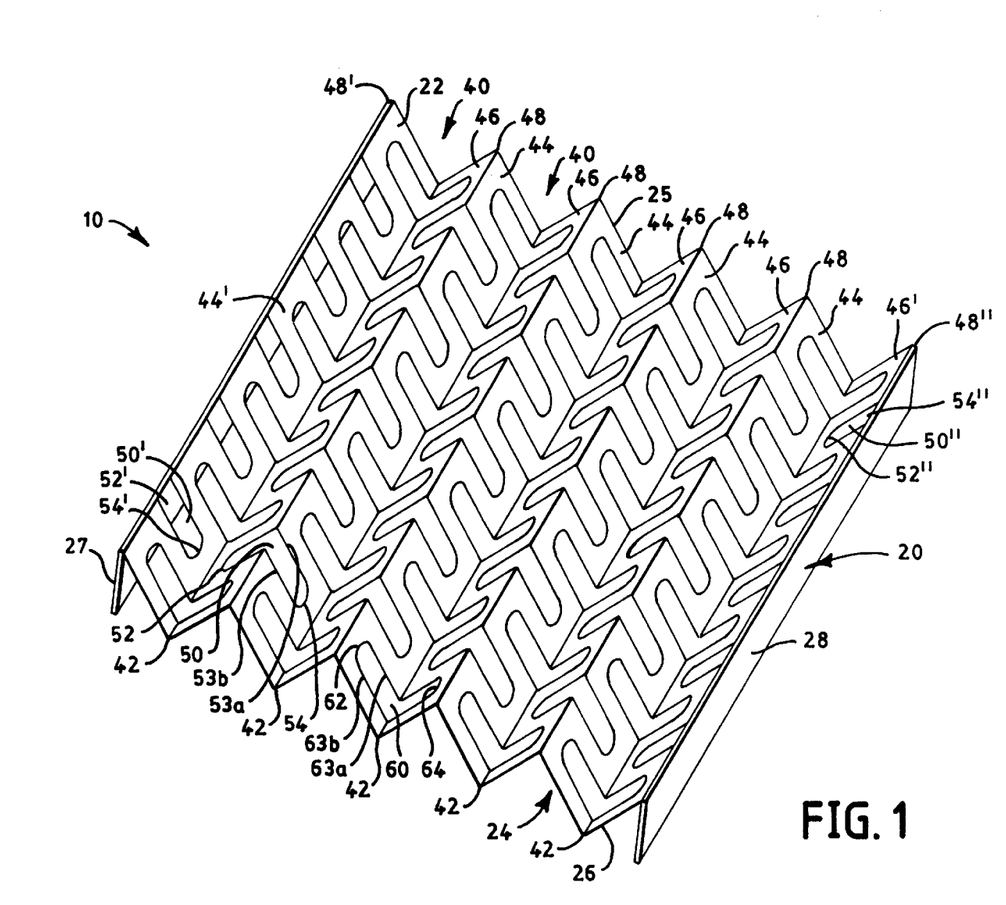
FIG. 1 is a top isometric view of the cooking grate from the Forward edge and right side.
Figure 2:
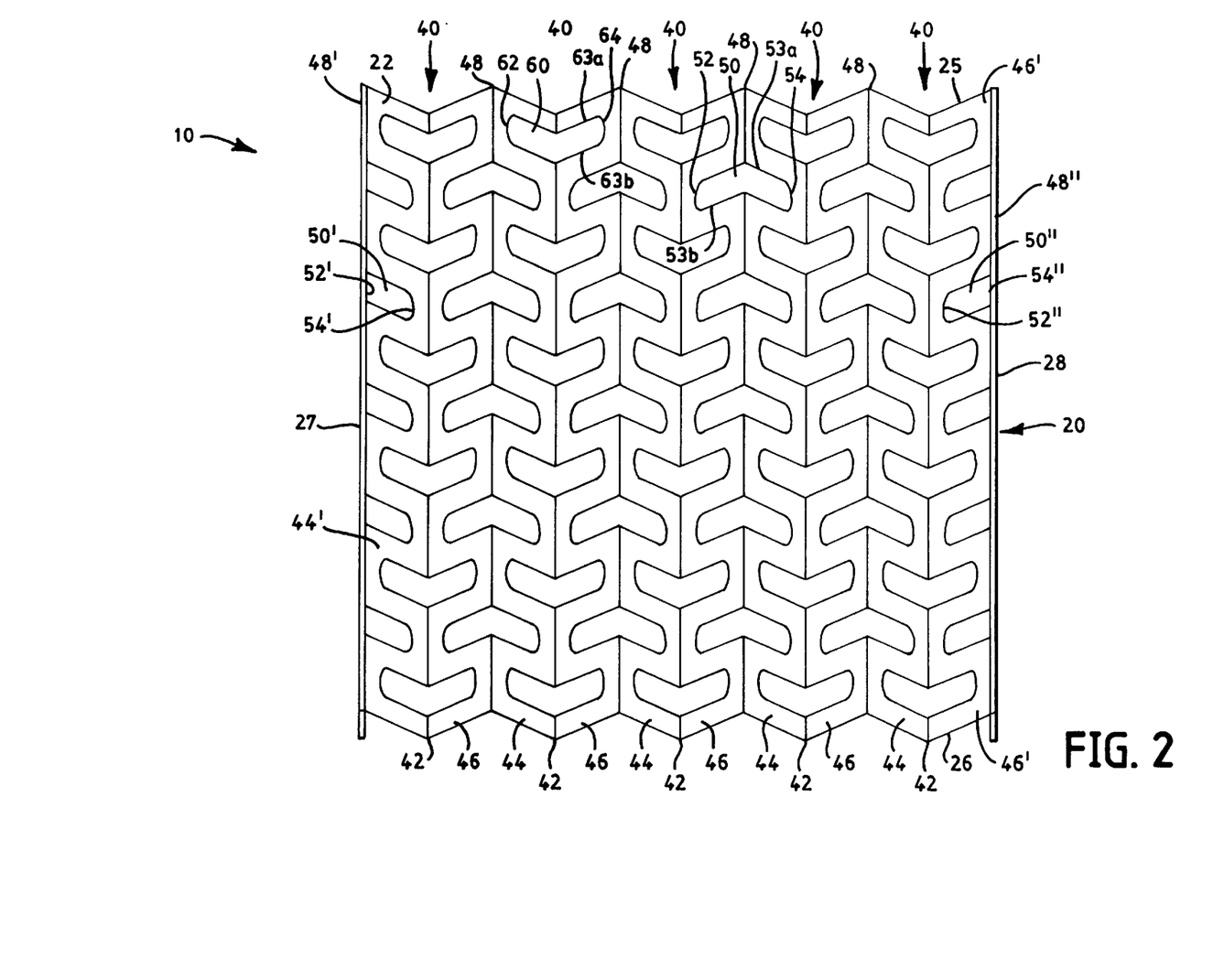
FIG. 2 is a top view of the cooking grate taken from the forward edge.
Figure 3:
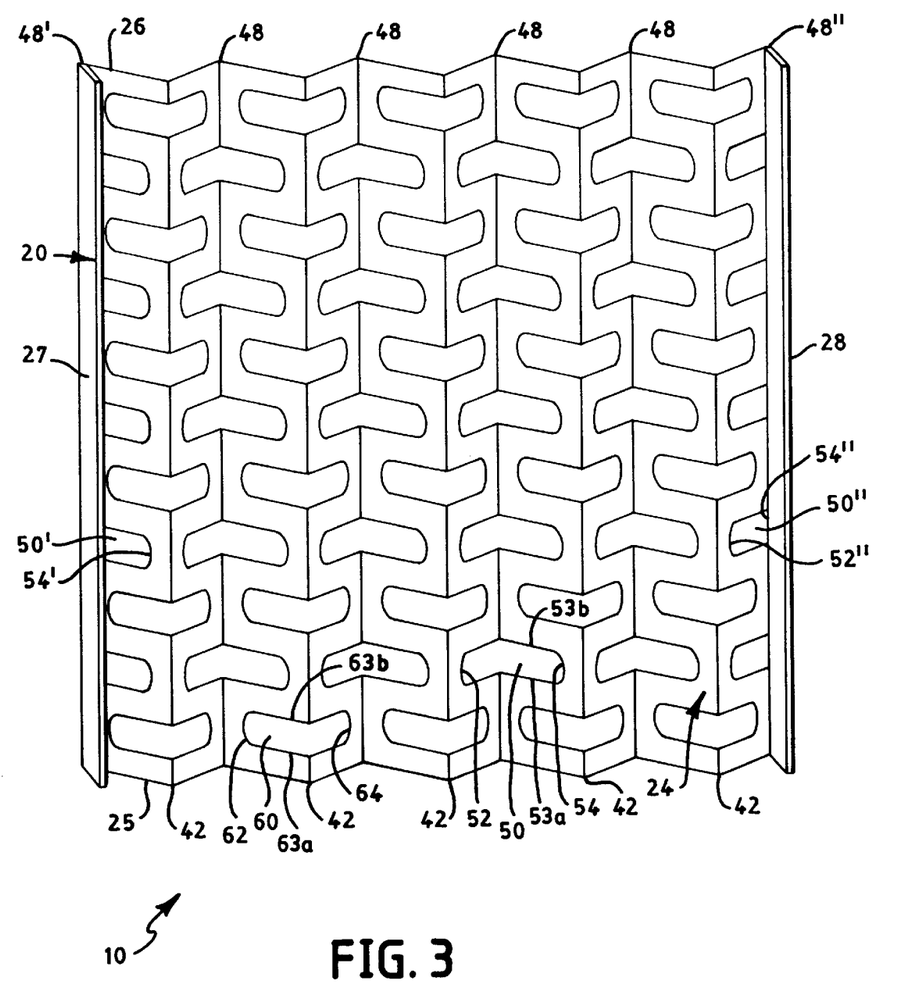
FIG. 3 is a bottom view of the cooking grate with the cooking grate standing on its rear edge.
Figure 4:
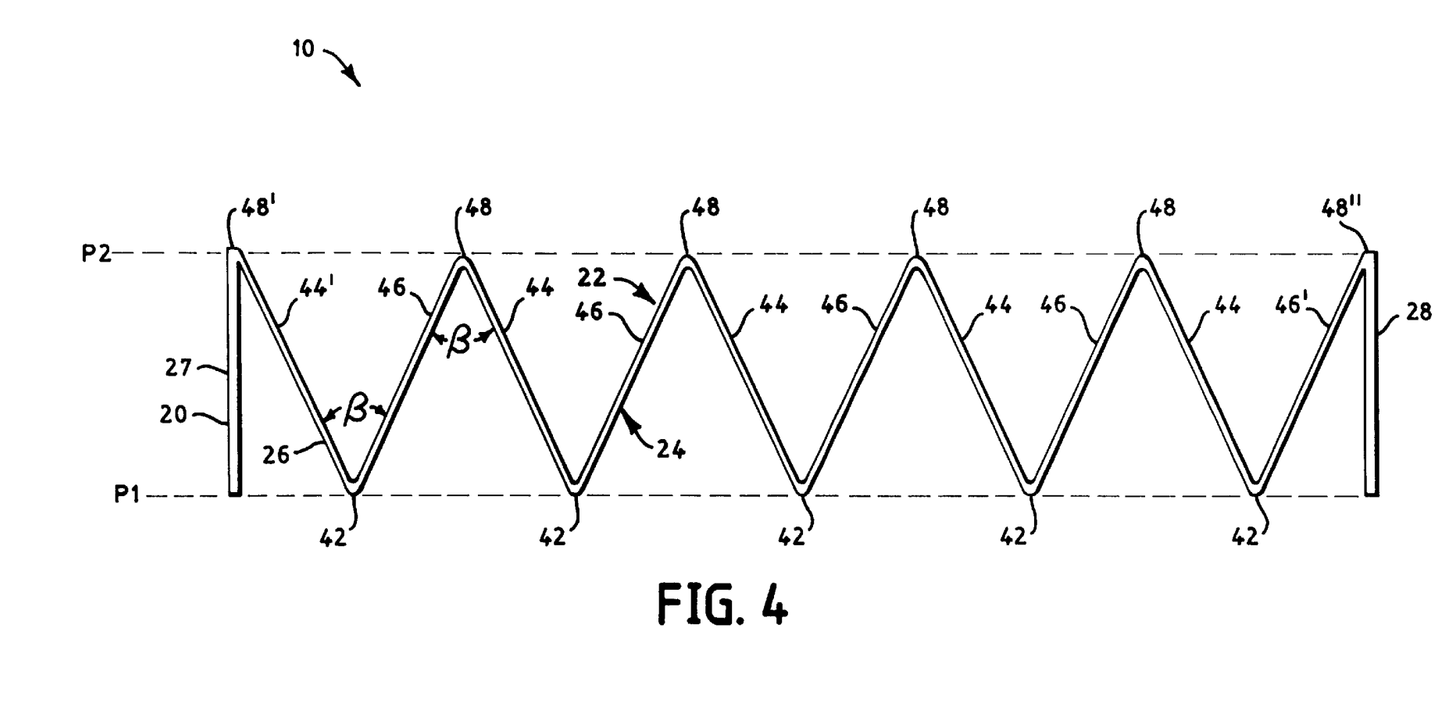
FIG. 4 is a view of the forward edge of the cooking grate illustrating its generally saw-tooth configuration.
Figure 5:
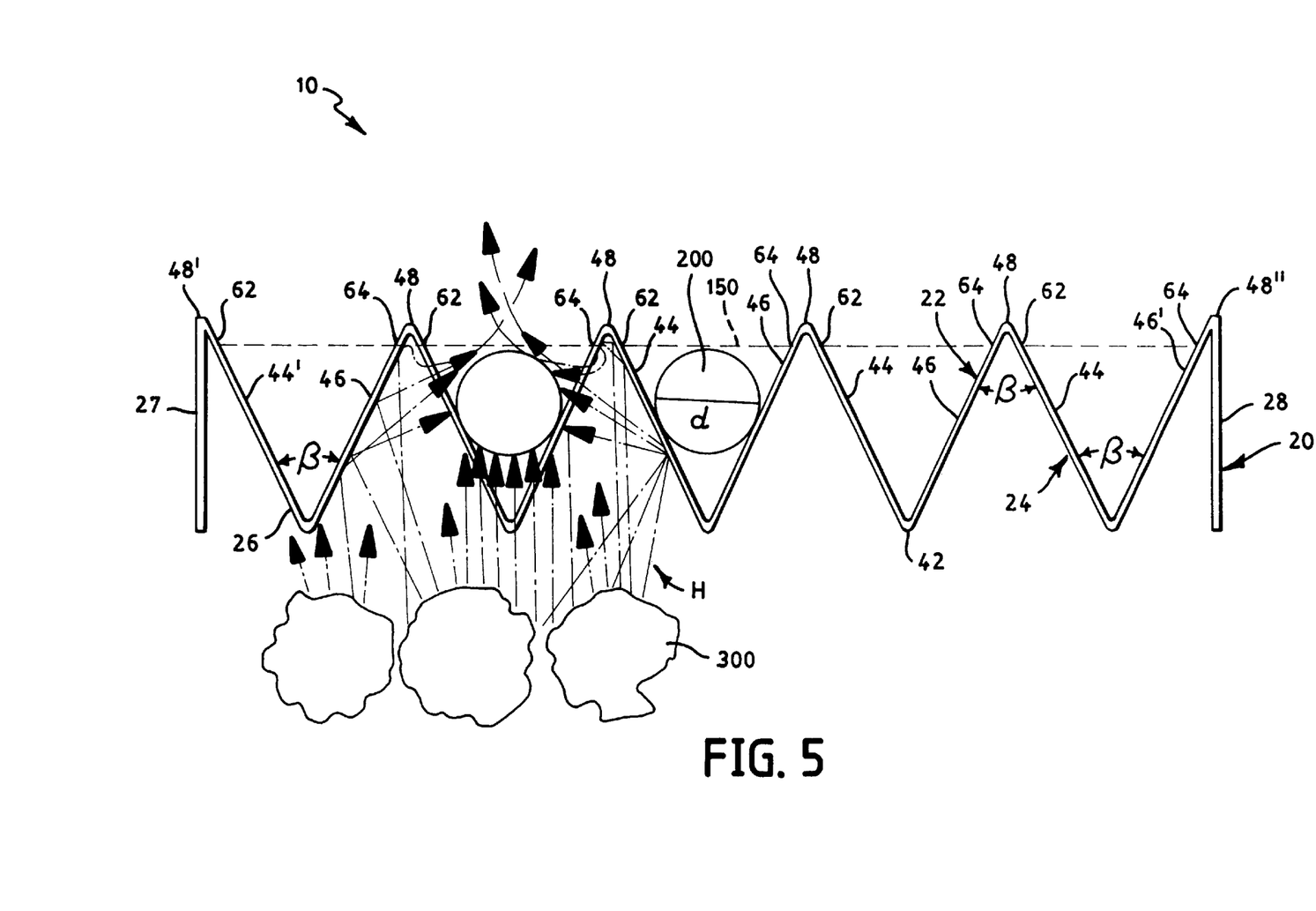
FIG. 5 is the same view as that of FIG. 4 further illustrating items of cylindrical foodstuff contained within two of the troughs for cooking, the diametric threshold defined by the left and right boundaries of the lower heat ports, and lines and curves representing the paths of heat originating from the heat source.

The left and right boundaries 62 and 64 of the lower heat ports 60 define a diametric threshold 150. Diametric threshold 150 is an imaginary line segment extending between the left and right boundaries 62 and 64 of each lower heat port 60, shown as; a dashed line in FIG. 5, beyond which the top portion of an item of cylindrical foodstuff 200 should not extend while cooking in order for cooking grate 10 to function as intended. Furthermore, in the preferred embodiment, peaks 48, 48', and 48" lie in a second plane P2 which is substantially parallel to the first plane P1 containing the spines 42 of each trough 40. Planes P1 and P2 are shown in phantom lines in FIG. 4. When the grate specifications and conditions regarding foodstuff diameter are met, foodstuff 200 is cooked with maximum efficiency. The top of the food is cooked in part by heat (i.e., heated gas) that is first trapped under peaks 48, 48', and 48" on the heat collecting surface side of grate body 20 and then forced and reflected through each lower heat port 60, adjacent left and right boundaries 62 and 64, over the top of cylindrical foodstuff 200. Much of the heat originating from heat source 300 will strike the lower heat collecting surface 24 at points below peaks 48, 48', and 48" in such a way that it will be directly reflected through lower heat ports 60 of cooking faces 44 and 46, adjacent the underside of the cooking face 44 or 46 which it initially struck, and onto the sides and top of cylindrical foodstuff 200. Most frequently, heat source 300 will be burning solid fuel such as charcoal. The thermodynamics occurring under, through, and above cooking grate body 20 are complex to state the least and are represented only schematically in FIG. 5; however, for purposes of explanation and simplification, it is fair to describe and illustrate the directing of heat geometrically through the use of lines and curves and to make use of such principles as "the angle of incidence equals the angle of reflection" as is done in FIG. 5 in which the heat is designated by the reference character H. As illustrated in FIG. 5, heat H will radiate in all directions from heat source 300— at least locally— and much of it, as it rises from the source, will impinge on lower heat collecting surface 24 of grate body 20 and be reflected through both upper and lower heat ports 50 and 60 as illustrated. It will be appreciated that a much larger percentage of the total heat H radiating from heat source 300 will be reflected onto all portions of cylindrical foodstuff 200, particularly the top portions, than has heretofore been realizable with prior cooking grate devices. In addition to heat directed through heat ports 50 and 60, there will be a considerable amount of heat propagation through grate body 20 itself, depending on the thermal conductivity of grate body 20, which heat is not represented in FIG. 5.

To prevent too much heat H from being trapped under peals 48 and directed over the tops of cylindrical foodstuffs 200 through lower heat ports 60, and to assist in cooking cylindrical foodstuffs 200, upper heat ports 50 allow some heat to escape out the top of peaks 48 and some to be reflected onto cylindrical foodstuffs 200 in areas primarily along the sides of cylindrical foodstuff 200. The trapping of too much heat H could have at least two detrimental effects: first, it could cause the sides and tops of the cylindrical foodstuffs 200 to burn, thereby defeating the purpose of the design and, two, grate body 20, preferably being constructed of metal, could buckle under the intense heat H where too large a temperature gradient exists between the lower heat collecting surface 24 and the upper cooking surface 22. While it is conceivable that these two detrimental effects can be circumvented by other means, particularly the latter effect where the material chosen for grate body 20 is not metal, the inventor's actual reduction to practice and experimentation with varying parameters have resulted in what the inventor regards and herein discloses as the best mode of the invention.

It is recognized by the inventor that it is possible to construct a cooking grate 20 in accordance with the most basic and broadest principles of this invention which altogether excludes upper heat ports 50 and, in fact, the inventor claims such an embodiment. Also, the widths, lengths, spacing and orientation of upper and lower heat ports 50 and 60 may be varied in ways that are consistent with and encompassed by the scope and intent of this invention. It is believed by the inventor, however, that while an embodiment having circular or even square heat ports 50 and 60 may occur to those having ordinary skill in the art, and would be simple to manufacture, some elongation in the horizontal direction as described best facilitates the desired results and, therefore, a grate body 20 having circular and/or square heat ports 50 and 60, while within the scope of this invention, is not preferred. It should be noted that where heat ports 50 and 60 are circular or square, there necessarily will not be long sides 53a, 53b, 63a, and 63b "extending at least partially in the horizontal direction." As a final point with regard to the shapes of heat ports 50 and 60, they may also be elliptical with the major axis of the ellipse extending at least partially in the horizontal direction; in such cases, the curved halves of the ellipse on either side of the major axis shall be regarded as long sides 53a, 53b, 63a, and 63b of upper heat ports 50 and lower heat ports 60, respectively.

Another parameter that lends itself to ready variation is the angle at which the left and right cooking faces 44 and 46 defining troughs 40 diverge from one another and converge upon the cooking faces 44 and 46 of adjacent troughs 40. Two principles in this regard will readily occur to those with even a minimal understanding of geometry. First, if spines 42 are to lie substantially in a first plane P1 and peaks 48 are to lie substantially in a second plane P2, which second plane P2 is substantially parallel to first plane P1, then the angle at which left cooking faces 44 and right cooking faces 46 diverge upwardly from spines 42 must be substantially equal to the angle below peaks 48 at which the cooking faces 44 and 46 converge upon the cooking faces 44 and 46 of adjacent troughs 40. Second, for any given diameter d of an item of cylindrical foodstuff 200, the smaller the angle of divergence β of cooking faces 44 and 46, the higher foodstuff 200 will be elevated off spines 42 and the wider cooking faces 44 and 46 will have to be in order to accommodate foodstuff 200 so that the top of foodstuff 200 does not extend above diametric threshold 150. At the other extreme, if the angle of divergence β of cooking faces 44 and 46 is too large, then cooking faces 44 and 46 will grow too wide and troughs 40 too shallow to make efficient use of material of which grate body 20 is constructed and to achieve the desired objectives of cooking grate 10 as they are described throughout this specification.

In recognition of these considerations, and through experimentation with various embodiments, the inventor regards the optimum angle of divergence β between cooking faces 44 and 46 as 65°. However, the disclosure of this angle is not intended in any way to be a limitation on the scope of this invention. An effective range of suggested angles β for which considerations such as thermodynamics, efficient use of material, overall size and weight of grate 10, the number of cylindrical food items 200 to be accommodated and others have been taken into account is between 50° and 80°. It is believed that angles of divergence β outside this range would result in too much of one or more factors being sacrificed to achieve the stated objectives although, once again, the suggested range should not be regarded as a limitation on the scope of this invention.

BRIEF DESCRIPTION OF A PROPOSED
METHOD OF CONSTRUCTING A COOKING
GRATE IN ACCORDANCE WITH THE
PRINCIPLES OF THE PRESENT INVENTION

As previously mentioned, the inventor has actually reduced the subject invention to practice and suggests to the reader in this section a general methodology for constructing the invention, although it is believed the method discussed will readily occur to one skilled in the art without such explanation. This explanation will be aided by reference to FIG. 7. Furthermore, this brief discussion of construction also assumes that the reader has read the detailed description of the invention above and adopted the terminology for various elements and directional designations discussed therein.

Figure 7:
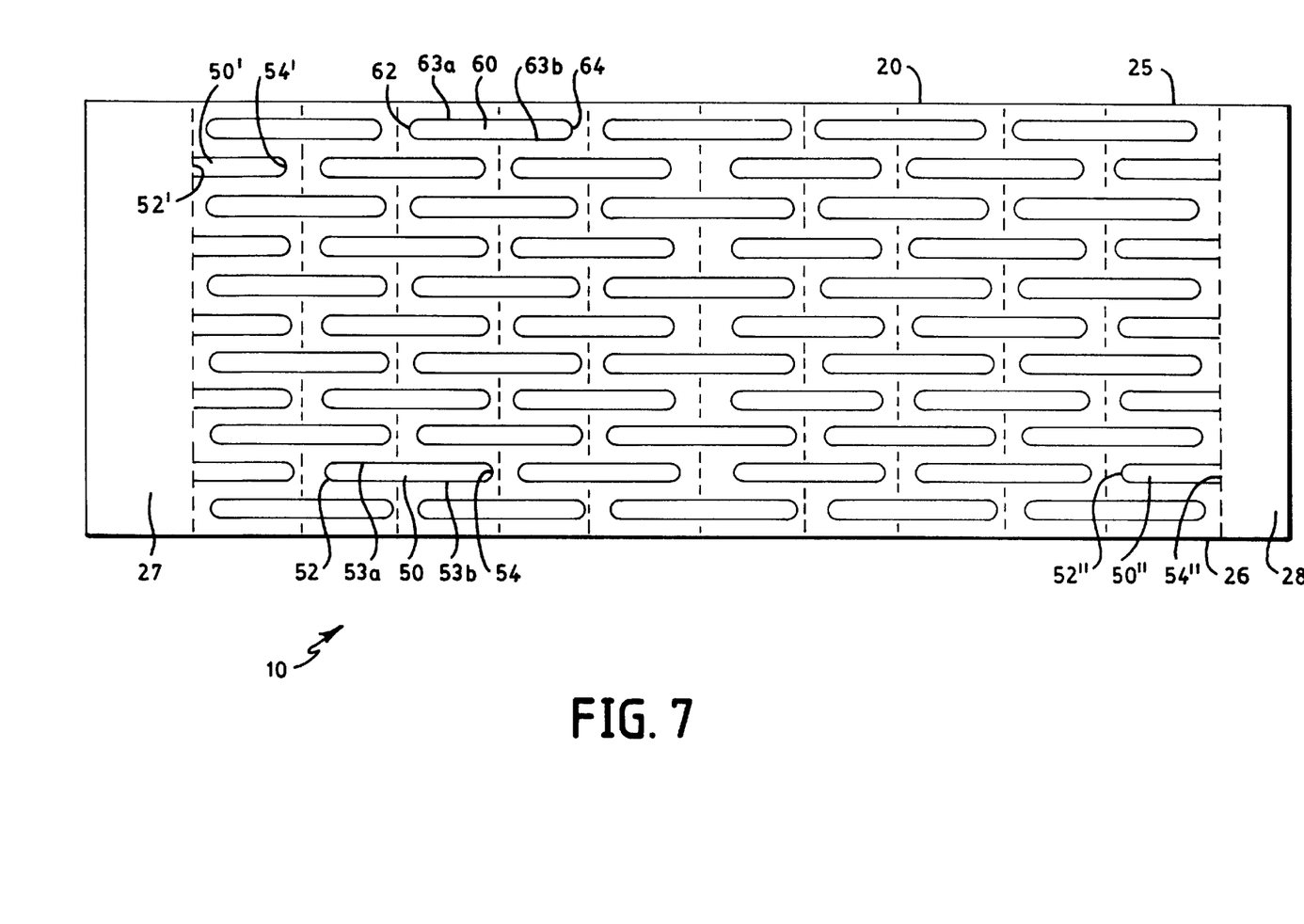
FIG. 7 illustrates a planar plate of steel after heat ports have been punched through it, but before it has been formed to create troughs, the dashed lines indicating where the plate is to be bent to form the spines and peaks of the troughs. This figure is referred to in the section addressing a method of construction of the present invention and is to be examined in conjunction therewith.

In constructing the invention, the inventor began with a rectarngular, planar plate of steel with no perforations therethrough. Next, elongated perforations were cut through the plate in an ordered manner such that alternating rows of what were to become upper and lower heat ports were formed. The reader should note how the ports of each type of row are offset from one another and how the perforations at the right and left ends of the plate are approximately half the length of the other perforations so that the remaining, unperforated metal at the ends may be bent to form substantially vertical, solid sides. The perforations may be formed by cutting or stamping out as is known in the art.

After the perforations were cut out, the plate of steel was ready for bending to form troughs. Bending may be accomplished in a single step by stamping if the maker is so equipped or each successive trough may be formed by bending the material one bend at a time with the appropriate bending tool. The plate of steel was bent so that bends were formed along what has been designated the transverse direction in the description supra. The bends alternate upward and downward to form peaks and troughs as described and bisect the perforations in the plate to form upper and lower heat ports as described.

It should also be noted that the cooking grate of the present invention may be formed by forging in a furnace and mold. Obviously, other more appropriate methods of construction must be implemented where the material from which the grate is to be constructed is not metal. For example, if the grate is to be made from a ceramic or glass material, obviously, the stamping and/or bending method may not be appropriate.

The foregoing is considered to be illustrative only of the principles of the invention. Furthermore, since numerous modifications and changes will readily occur to those skilled in the art, it is not desired that the foregoing limit the invention to the exact construction and operation shown and described. Accordingly, all suitable modifications and equivalents may be resorted to that appropriately fall within the scope of the invention. Other embodiments therefore will occur to those skilled in the art and are within the scope of the following claims:

What is claimed is:

1. A cooking grate adapted for the cooking of cylindrical foodstuffs comprising:

a unitary grate body having an upper cooking surface, a lower heat collecting surface, a rear edge, a forward edge, a left side, and a right side, said grate body being corrugated to form a plurality of substantially parallel and adjacent cooking troughs for receiving items of cylindrical foodstuff therein, each said trough having a spine extending in a transverse direction between said rear edge and said forward edge of said grate body, and leit and right cooking faces originating at said spine and diverging upwardly, each said left cooking face converging with one of a right cooking face of an adjacent trough and said left side of said grate body to form a peak and each said right cooking face converging with one of a left cooking face of an adjacent trough and said right side of said grate body to form a peak;

a plurality of lower heat ports, each said lower heat port comprising an opening in said grate body disposed entirely in one said trough and beginning at a left boundary on said left cooking face of said trough at an elevation lower than the peak at the top of said left cooking face, extending downwardly through the spine of said trough, and up said right cooking face of said trough to a right boundary located below said peak at the top of said right cooking face; and a plurality of upper heat ports, each said upper heat port comprising an opening in said grate body and beginning at a left end on one of said right cooking faces in one of said troughs at an elevation higher than said spine of said trough, extending through said peak at the top of said right cooking face, and down said left cooking face of the adjacent trough to a right end located above the spine of said adjacent trough, said lower and upper heat ports being arranged in rows which extend generally horizontally along the width of said grate body between said left and right sides of said grate body, said rows being uniform in and of themselves in that each said row is dedicated to one of said lower heat sorts and said upper heat ports, the unitary nature of the grate body being such that portions of upper heat ports reside in the same troughs as lower heat ports.

2. The cooking grate of claim 1 wherein said spines lie substantially in a first plane and said peaks lie substantially in a second plane, said first plane being substantially parallel to said second plane.

3. The cooking grate of claim 2 wherein said left and right cooking faces of each said trough are substantially planar and diverge upwardly from one another at an angle of divergence of 65°.

4. The cooking grate of claim 1 wherein each said left and right cooking face is substantially planar.

5. The cooking grate of claim 4 wherein said spines lie substantially in a first plane and said left and right boundaries of each said lower heat port are at substantially the same elevation relative to said first plane.

6. The cooking grate of claim 5 wherein each of said upper and lower heat ports comprises an elongated opening in said grate body with the long sides of each said opening extending at least partially in the horizontal direction along the width of said grate body between said left and right sides of said grate body.

7. The cooking grate of claim 6 wherein said rows of upper and lower heat ports are substantially parallel to one another and to said rear and forward edges of said grate body.

8. The cooking grate of claim 7 wherein said rows of upper and lower heat ports are alternating such that no two rows of upper heat ports are adjacent one another and no two row of lower heat ports are adjacent one another.

9. The cooking grate of claim 8 wherein said peaks lie substantially in a second plane which is substantially parallel to said first plane.

10. The cooking grate of claim 9 wherein said left and right cooking faces of each said trough diverge upwardly from one another at an angle of divergence of 65°.

11. The cooking grate of claim 1 wherein said rows of upper and lower heat ports are substantially parallel to one another and to said rear and front edges of said grate body.

12. The cooking grate of claim 1 wherein each of said upper and lower heat ports comprises an elongated opening in said grate body with the long sides of each said opening extending at least partially in the horizontal direction.

13. The cooking grate of claim 12 wherein said rows of upper and lower heat ports are substantially parallel to one another and to said rear and forward edges of said grate body and alternating such that no two rows of upper heat ports are adjacent one another and no two rows of lower heat ports are adjacent one another.

14. The cooking grate of claim 1 wherein said grate body is constructed of metal.

15. The cooking grate of claim 14 wherein the metal from which said grate body is constructed is steel.

16. A cooking grate adapted for the cooking of cylindrical foodstuffs comprising:

a unitary grate body having an upper cooking surface, a lower heat collecting surface, a rear edge, a forward edge, a left side, and a right side, said grate body being corrugated to form a plurality of substantially parallel and adjacent cooking troughs for receiving items of cylindrical foodstuff therein, each said trough having a spine extending in a transverse direction between said rear edge and said forward edge of said grate body, and left and right cooking faces originating at said spine and diverging upwardly, each said left cooking face converging with one of a right cooking face of an adjacent trough and said left side of said grate body to form a peak and each said right cooking face converging with one of a left cooking face of an adjacent trough and said right side of said grate body to form a peak;

a plurality of lower heat ports, each said lower heat port comprising an elongated opening in said grate body with the long sides of each said opening extending at least partially in a horizontal direction along the width of said grate body extending between said left and right sides of said grate body, each said lower heat port being disposed entirely in one said trough and beginning at a left boundary on said left cooking face of said trough at an elevation lower than the peak at the top of said left cooking face, extending downwardly through the spine of said trough, and up said right cooking face of said trough to a right boundary located below said peak at the top of said right cooking face; and a plurality of upper heat ports, each said upper heat port comprising an elongated opening in said grate body with the lone sides of each said opening extending at least partially in the horizontal direction, each said upper heat port beginning at a left end on one of said right cooking faces in one of said troughs at an elevation higher than said spine of said trough, extending through said peak at the top of said right cooking face, and down said left cooking face of the adjacent trough to a right end located above the spine of said adjacent trough, said lower and upper heat ports being arranged in rows which extend generally horizontally along the width of said grate body between said left and right sides of said grate body, said rows being uniform in and of themselves in that each said row is dedicated to one of said lower heat ports and said upper heat ports, the unitary nature of the grate body being such that portions of upper heat ports reside in the same troughs as lower heat ports.

17. The cooking grate of claim 16 wherein said spines lie substantially in a first plane and said peaks lie substantially in a second plane, said first plane being substantially parallel to said second plane.

18. The cooking grate of claim 16 wherein said rows are substantially parallel to one another and to said rear and forward edges of said grate body and alternating such that no two rows of upper heat ports are adjacent one another and no two rows of lower heat ports are adjacent one another.

* * * * *